L. R. INGERSOLL.
APPARATUS FOR MEASURING THE GLOSS OF NON-METALLIC SURFACES.
APPLICATION FILED DEC. 20, 1915.
1,225,250.
Patented May 8, 1917.
2 SHEETS—SHEET 1.
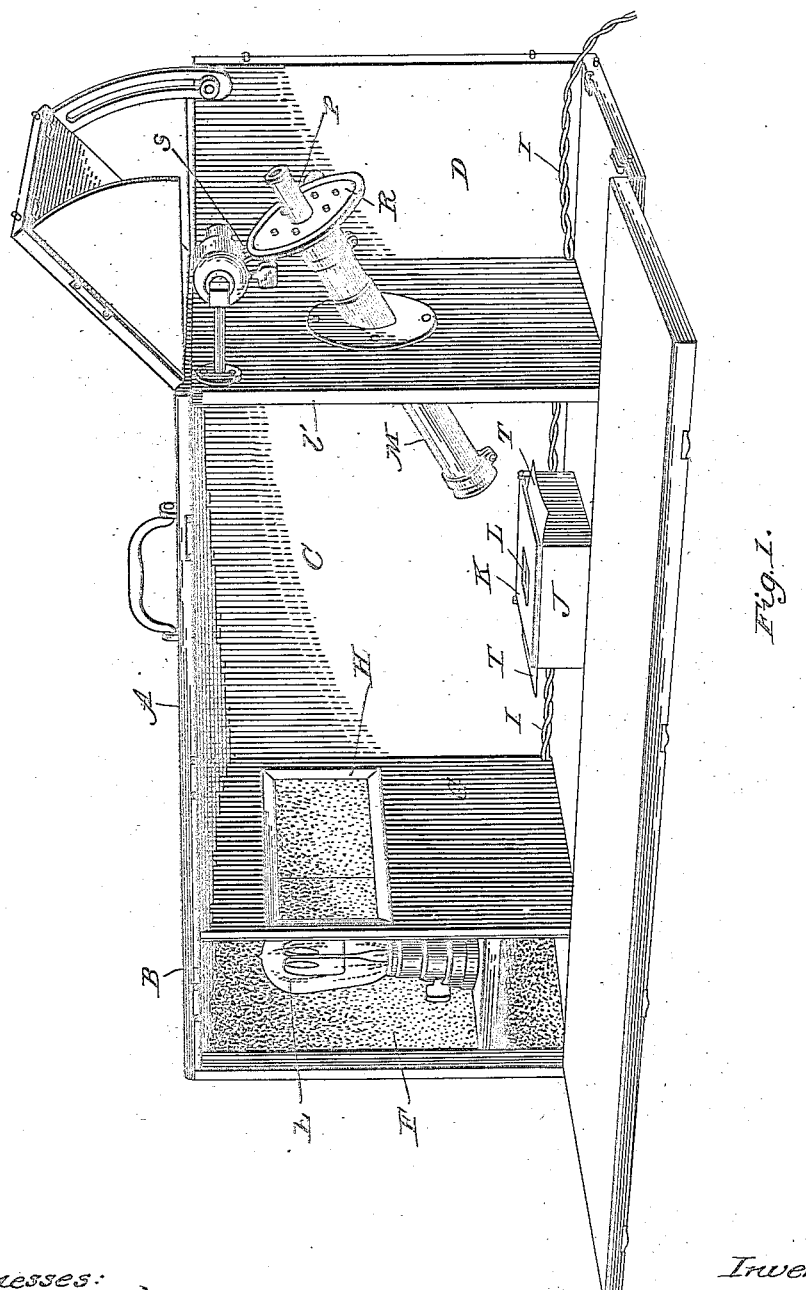
Fig. I.
Witnesses:
Inventor:
Leonard R. Ingersoll.

L. R. INGERSOLL.
APPARATUS FOR MEASURING THE GLOSS OF NON-METALLIC SURFACES.
APPLICATION FILED DEC. 20, 1915.
1,225,250.
Patented May 8, 1917.
2 SHEETS—SHEET 2.
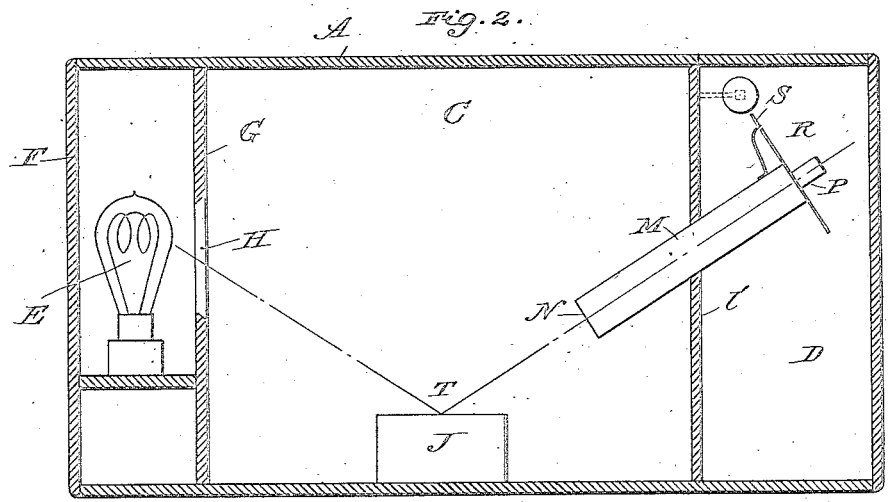
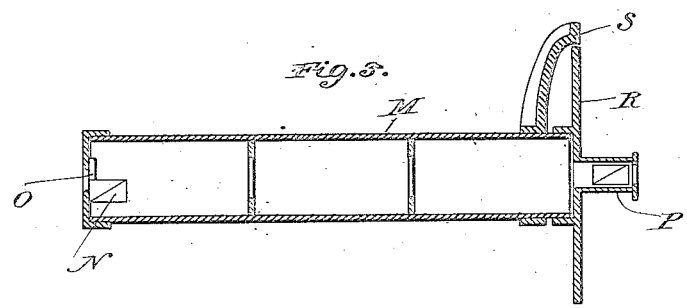
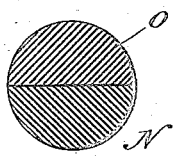
Witnesses:
Inventor:
Leonard R. Ingersoll.
Attorney.

UNITED STATES PATENT OFFICE.

LEONARD R. INGERSOLL, OF MADISON, WISCONSIN.

APPARATUS FOR MEASURING THE GLOSS OF NON-METALLIC SURFACES.

1,225,250. Specification of Letters Patent. Patented May 8, 1917.

Application filed December 20, 1915. Serial No. 67,867.

(DEDICATED TO THE PUBLIC.)

*To all whom it may concern:*

Be it known that I, LEONARD R. INGERSOLL, of the city of Madison, Wisconsin, a citizen of the United States of America, and an employee of the Department of Agriculture of the said United States, and a resident of Madison, in the State of Wisconsin, (whose post office address is Madison, Wisconsin,) have invented a new and useful Improvement in Apparatus for Measuring the Gloss of Non-Metallic Surfaces.

This application is made under the act of March 3, 1883, chapter 143 (22 Stat. 625), and the invention herein described and claimed may be used by the Government of the United States, or any of its officers or employees in the prosecution of work for the Government, or any person in the United States, without the payment to me of any royalty thereon.

My invention relates to an apparatus for measuring by optical means, involving a comparison between specularly reflected and diffusely reflected light, the gloss, or glossiness, or luster, or shininess of non-metallic surfaces, in particular that of paper. It applies to any reasonably plane surface from which the specularly reflected light is plane polarized when reflection takes place at a certain angle. From experiments I find that a satisfactory method for measuring gloss must be optical rather than mechanical in character, for the smoothness of the paper is by no means a safe measure of its quality as regards gloss. It is well known that the character of the light reflected from a sheet of paper is classified under three different types, viz:

(*a*) Specular reflection, as from a polished surface of metal or sheet of glass, the "angle of reflection" equaling in this case the "angle of incidence";

(*b*) Diffuse reflection, as from a perfect mat surface, characterized by the light being sent off nearly equally in all directions from the surface; and (*c*) A combination of the two preceding classifications, which may be regarded as produced by overlaying a perfect mat surface with one or more sheets of glass.

The first type, or specular reflection, causes what is known as "glare" from the paper, that is, the brilliant, directly reflected light which to a certain extent dazzles the eye of the reader, causing contraction of the pupil and consequent loss of visual acuity and resulting eye strain. The diffuse reflection gives rise to the soft, evenly illuminated appearance of mat surface paper, which if combined with a dead black ink, gives a combination which affords the greatest ease to the eye of the reader. It is the third type which is really characteristic of the reflection from paper, as the most highly glazed paper still gives a little diffuse reflection, while even as dead a surface as that of a soft blotter shows a small amount of specularly reflected light.

It is characteristic of a glass surface that light reflected from it at an angle of $57\frac{1}{2}°$ is practically completely plane polarized, and from experiments which I have conducted I have ascertained that the same is true of the specularly reflected component from paper. My experiments disclose that pieces of glazed white paper, calendered black cardboard, calendered white paper, and brown solio paper all show at the angle specified a polarization of the glare component estimated at more than 99 per cent. complete. My instrument is designed to measure gloss by determining the fraction of the light reflected from the paper at an angle at $57\frac{1}{2}°$, which is polarized, the illumination falling on the paper at approximately the same angle.

It is not the absolute brilliancy of the glare spot which I measure, but rather the fraction of the total light entering the observing part of the instrument (glariscope) which is specularly reflected. This is taken as a measure of the gloss, or glossiness, or shininess, or luster of a sample of paper suitable for printing purposes, in so far as these terms describe or affect the readability of such paper. For it is the relative proportion of specularly reflected light (causing glare) and diffuse reflection which determines the readability of a given paper—that is, its ease on the eye of the reader—rather than the absolute magnitude of either.

The scale on which gloss is measured in the way described does not depend on the intensity of the illumination, but it is influenced by the shape and extent of the source of light, whether it be broad or narrow, a window or an incandescent bulb. It is necessary, therefore, to adopt some particular type of illumination to which to refer all such measurements. In my instrument the illumination chosen is that from a vertical opening three inches square whose center is at a distance of 11⅜ inches from that of the (horizontal) test sheet of paper, and a line from whose center makes an angle of 57½° with the perpendicular to the test sheet. The opening is covered with two thicknesses of tracing cloth, behind which is located a Tungsten lamp of forty to sixty watts, with reflector, if desired. While the selection of this arbitrary standard of illumination is highly desirable, it is not entirely necessary, and a larger or smaller opening would merely result in lowering or raising the fraction which represents the gloss of each specimen of paper, and would not in general alter the order in the series in which any particular specimen may come. It will be understood that an illuminating window of the size I have specified applies only to an instrument of the size contemplated in this description. If it is desirable to construct a smaller or larger instrument the size of the window may be modified accordingly.

The nature, characteristic features, and scope of my invention will be more readily understood from the following description taken in connection with the accompanying drawing, forming a part hereof, wherein:

Figure 1 is a front view of my apparatus with cover or side open;

Fig. 2 is a vertical section through front of casing;

Fig. 3 is a sectional view of the glariscope; and

Fig. 4 shows the field presented in the glariscope with the arrangement illustrated in Fig. 3.

Referring to the drawings, A represents the casing which may be constructed of any suitable material. This casing is divided into three compartments, B, C and D. In compartment B an illuminator, E, is located, together with a reflector, F, secured in the rear thereof, and in the wall, G, dividing the compartments B and C, a window, H, is provided. The use of a reflector such as is represented by F is optional. Any light which affords suitable illumination for making the test herein outlined may be employed. In practice, however, I prefer to use a tungsten lamp of 40 to 60 watts, and in the drawings I have shown a lamp of this type. Current for the illumination is furnished by means of the wires, I, which may connect the illuminator, E, with a convenient source of electric current. In compartment C, I provide, at a proper point, a support or base, J, on which rests the sample paper to be tested. This paper is held perfectly flat by a brass or other heavy cover frame, K, having an opening, L, therein, which permits the exposure of approximately one spuare inch of the surface of the test sheet. Passing through the wall, l' dividing the compartment C from the compartment D, in a tilted position, is a glariscope, M, which may be secured to the wall, l', in any satisfactory manner. The glariscope M, consists of a one-quarter inch diaphragm having the opening at its far end covered partially with a small Nicol (Lippich) prism, N, and partly with a piece of smoke glass (No. 2 smoke glass), O. The Nicol prism, N, and smoke glass, O, might be replaced by a combination of two polarizing prisms, or, under certain circumstances, by a double-image prism, or even by a polarizer involving the use of a pile of glass plates, without altering in any way the essential features or principle of the instrument. Arranged in the other end of said diaphragm is a Nicol (Glan-Thompson) prism, P. This prism, P, is mounted to rotate on a divided circle, R, which reads with the aid of the vernier, S, to five minutes of the arc. The use of an eyepiece lens would allow a considerable shortening of the glariscope.

The glariscope is so adjusted in the wall, l', that it is adapted to measure the gloss by means of light reflected from the test paper, T, placed on the base, J, in the compartment, C, at an angle of 57½°, and the illuminator, E, is so located in compartment B as to enable the light reflected therefrom to fall on the test paper, T, arranged in the position described, at approximately the same angle. In operation the illuminator, E, is lighted by any convenient means, preferably by electricity. The light therefrom passes through the window, G, at an angle, on to the test paper, T. The light reflected from the test paper first passes through the diaphragm of the glariscope, M, but approximately one-half of this light, however, is absorbed by the smoke glass, O. The beam then passes through the eyepiece, P, and thence to the eye of the operator.

In practising my invention, the operator engaged in making the test looks through the eyepiece, P, in so doing he sees a divided field of view (as shown in Fig. 4) with the Nicol prism, N, below and the smoke glass, O, above. The instrument then is carefully adjusted so that the Nicol prism, N, shuts off completely the specular (polarized) component of the light from the test paper. Measurement is made by turning the divided circle, R, until the two fields appear of equal brilliancy, or, in other words, until the dividing line between the two fields seems to disapper. This action gives a reading which enables the operator at once to compute the gloss. To illustrate this reading, let $x$ represent the fraction of the light which is plane polarized, and which, as I have hereinbefore described, is taken as a measure of the degree of the gloss; let $a$ represent the transmission coefficient (for light polarized in its plane) of the Nicol prism, N, and $b$ the transmission coefficient for the smoke glass, O. By this computation the intensities of the two beams transmitted through the Nicol prism, N, and the smoke glass, O, of the glariscope, M, will be proportional to $\frac{1}{2}a$ $(1-x)$ from the Nicol prism N
and
$b$ from the smoke glass O.

When these beams are viewed through the Nicol eyepiece, P, whose principal plane makes an angle, Q, with that of the nicol, N, these intensities are reduced to $\frac{1}{2}a \cos^2 Q \ (1-x)$
and
$\frac{1}{2}b \ (1-x)+b\times\sin^2 Q$, respectively.

When these two are made equal by altering the angle Q, I have $$\begin{aligned}(1)\quad \frac{1}{2}a \cos^2 Q \ (1-x) &= \frac{1}{2}b \ (1-x)+b\times\sin^2 Q \\ &= \frac{1}{2}b \ (1+x) \sin^2 Q + \frac{1}{2}b \ (1-x) \cos^2 Q.\end{aligned}$$

To eliminate $a$ and $b$, a reading is made on unpolarized illumination (furnished by a sheet of soft blotting paper illuminated directly from above) in which case, since $x=0$, $$\frac{1}{2}a \cos^2 Q' = \frac{1}{2}b$$
or
$$(2) \quad \frac{b}{a} = \cos^2 Q'$$

Then I may write for (1)

$$\frac{1-x}{1+x} = \frac{\cos^2 Q' \sin^2 Q}{\cos^2 Q - \cos^2 Q' \cos^2 Q}$$

which, after a little reduction, becomes $$(3) \quad \frac{1-x}{1+x} = \frac{\tan^2 Q}{\tan^2 Q'}$$

It appears then from equation 3 that it is possible to determine the quantity $x$ if the two angles Q and Q' are known. As Q' may be determined once and for all, and is really a constant of the instrument, it follows that a determination of Q is all that is necessary, and this determination is reached by taking the average of a series of, say, three to five settings with the instrument. Having determined Q, the value of $x$ is given at once by means of a small table computed with the aid of (3) so that the whole process of determining the gloss of a particular specimen requires hardly a minute of time.

By experiments which I have conducted I have observed that glazed onion skin paper showed, when tested by the use of my instrument and in the fashion herein described, almost the same gloss as postal card. This result apparently seems inconsistent with that which one would obtain by making a hasty visual inspection of the gloss of these two specimens. Nevertheless the tests of these specimens by the aid of my device, clearly demonstrate that casual eye observations of glossiness are unreliable in cases where the papers are of widely different texture, like cardboard and thin paper.

Black and colored papers give higher gloss readings than white papers of the same finish. This ought to be so since the specularly reflected light is almost independent of the shade of the paper, while the diffusely reflected light is much less for the darker shades. The glossiness, as measured in this way, will accordingly be higher for the darker colors. Readings on solio paper of various shades will give measurements in illustration of this point.

As many changes could be made in the construction of the device herein described, and many apparently widely different embodiments could be made without departing from the spirit thereof, I intend that all matter contained in the above description or shown in the accompanying drawings shall be interpreted as illustrative and not in a limiting sense.

Having thus described my invention, I claim:

An apparatus consisting of a casing, a support for the sample to be tested, a source of light directed at an angle to the support, a measuring instrument at an angle to the support, said instrument comprising an objective opening, a polarizer and a smoked glass, each covering approximately one-half of the objective opening and an analyzer.

In testimony whereof, I have signed my name to this specification, in the presence of two witnesses.

LEONARD R. INGERSOLL.

Witnesses:
 ROLF THELEN,
 GLENN S. CUSTER.